(12) United States Patent
Muto

(10) Patent No.: US 12,010,290 B2
(45) Date of Patent: Jun. 11, 2024

(54) IMAGE DISPLAY METHOD, IMAGE DISPLAY DEVICE, AND PROGRAM

(71) Applicant: NIPPON TELEGRAPH AND TELEPHONE CORPORATION, Tokyo (JP)

(72) Inventor: Makoto Muto, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/266,184

(22) PCT Filed: Dec. 11, 2020

(86) PCT No.: PCT/JP2020/046300
§ 371 (c)(1),
(2) Date: Jun. 8, 2023

(87) PCT Pub. No.: WO2022/123771
PCT Pub. Date: Jun. 16, 2022

(65) Prior Publication Data
US 2024/0098244 A1 Mar. 21, 2024

(51) Int. Cl.
*H04N 13/395* (2018.01)
*H04N 13/122* (2018.01)

(52) U.S. Cl.
CPC ......... *H04N 13/395* (2018.05); *H04N 13/122* (2018.05)

(58) Field of Classification Search
CPC . H04N 13/388–395; H04N 13/10–194; G09G 2300/02–023
See application file for complete search history.

(56) References Cited

U.S. PATENT DOCUMENTS

| | | | | |
|---|---|---|---|---|
| 2011/0191707 A1* | 8/2011 | Lee | ...... | G03H 1/2294 359/9 |
| 2012/0060089 A1* | 3/2012 | Heo | ...... | G06F 3/04883 715/702 |
| 2014/0035942 A1* | 2/2014 | Yun | ...... | G06F 1/1637 345/592 |

OTHER PUBLICATIONS

Isaka et al. (2018) ""Kirari! for Arena" to surround the competition space and watch the game" NTT Technical Journal vol. 30, No. 10, pp. 21-24.

* cited by examiner

*Primary Examiner* — Hang Lin

(57) ABSTRACT

An image display method according to the present disclosure includes: a step of extracting each portion obtained by dividing one display target of the first and second display targets from one display target (S11); a step of determining whether the extracted portion is in contact with the other display target for each portion of one display target based on attribute information indicating presence of contact between each portion and the other display target among the first and second display targets (S12); and a step of displaying the extracted portion on a display device that displays the other display target when it is determined that the extracted portion is in contact with the other display target (S13) and displaying the extracted portion on a display device that displays one display target when it is determined that the extracted portion is not in contact with the other display target (S14).

6 Claims, 20 Drawing Sheets

Fig. 3

| PORTION | PRESENCE OF CONTACT WITH SUBJECT s1 |
|---------|---------------------------------------|
| BODY    | ABSENT                                |
| RACKET  | PRESENT                               |

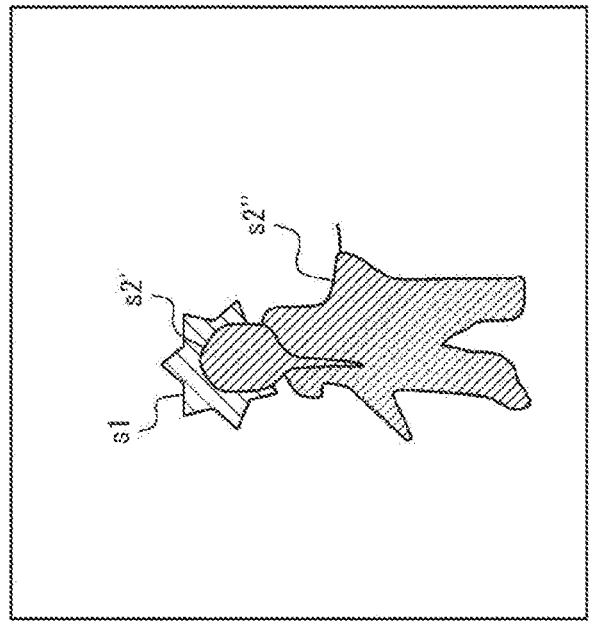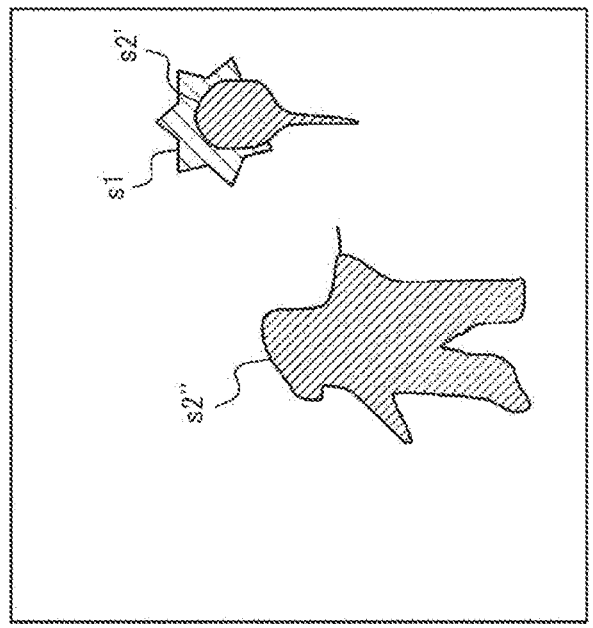
Fig. 7

Fig. 9

| PORTION | PRESENCE OF CONTACT WITH SUBJECT s1 | PRESENCE OF BLURRING DESIGNATION |
|---|---|---|
| BODY (OTHER THAN ARMS) | ABSENT | ABSENT |
| BODY (ARMS) | ABSENT | PRESENT |
| RACKET (OTHER THAN HANDLE) | PRESENT | ABSENT |
| RACKET (HANDLE PORTION) | PRESENT | PRESENT |

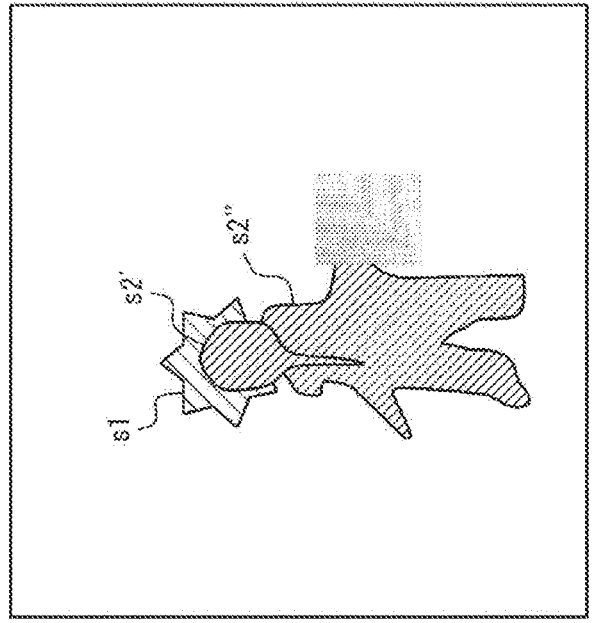
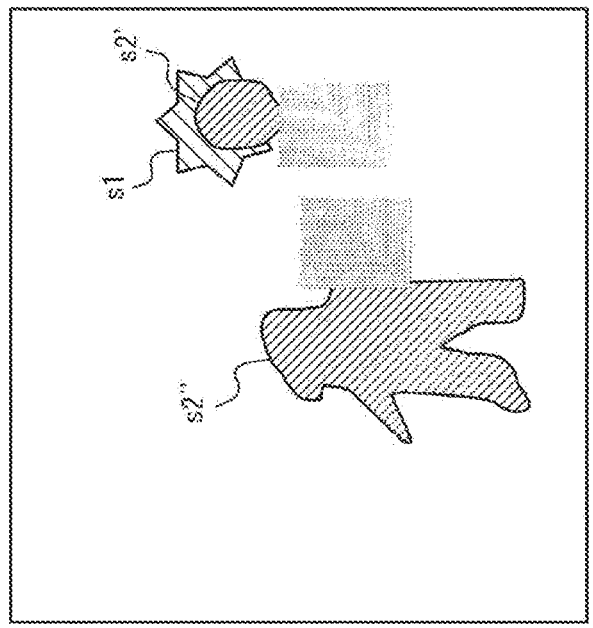
Fig. 12

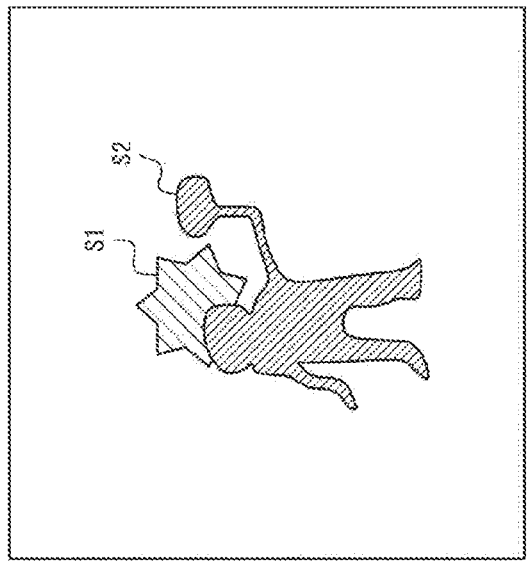
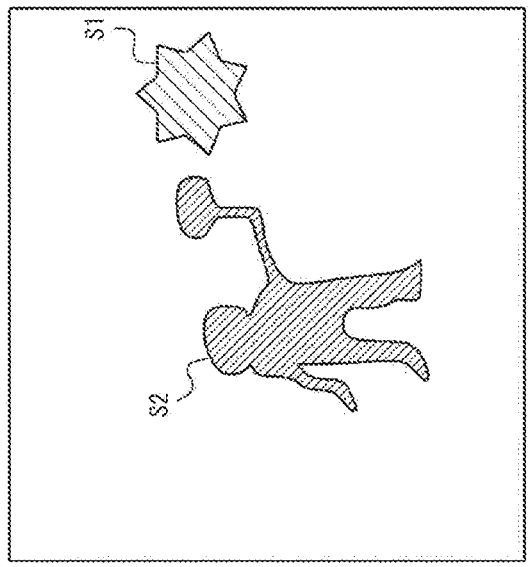
Fig. 20

IMAGE DISPLAY METHOD, IMAGE DISPLAY DEVICE, AND PROGRAM

CROSS-REFERENCE TO RELATED APPLICATIONS

This application is a U.S. National Stage Application filed under 35 U.S.C. § 371 claiming priority to International Patent Application No. PCT/JP2020/046300, filed on 11 Dec. 2020, the disclosure of which is hereby incorporated herein by reference in its entirety.

TECHNICAL FIELD

The present disclosure relates to an image display method, an image display device, and a program.

BACKGROUND ART

Conventionally, a method of presenting a plurality of subjects in an image (for example, a clipped image of a player in an image of a badminton game) to a viewer by a plurality of pseudo-virtual image devices (display devices) arranged in the depth direction when viewed from the viewer. According to this method, a plurality of pseudo-virtual image devices are arranged in accordance with the actual positions of the plurality of subjects in the depth direction, and the image corresponding to each subject is displayed on the pseudo-virtual image device arranged at the position corresponding to the subject. By doing so, the image of the subject actually located on the front side is displayed on the pseudo-virtual image device on the front side, and the image of the subject actually located on the back side is displayed on the pseudo-virtual image device on the back side. Thus, the viewer can get a more realistic sense of depth. Here, since a transmissive display device is used, the portion where the subject is not displayed can be seen through, so the user can visually recognize the image displayed on the pseudo-virtual image device on the back side in the transparent portion (for example, see NPL 1).

CITATION LIST

Non Patent Literature

NPL 1: Takeru Isaka, Motohiro Makiguchi, and Hideaki Takada, "Kirari! for Arena" Watching a game while surrounding the competition space, NTT Technical Journal 2018.10, p21-p24

SUMMARY OF INVENTION

Technical Problem

The above method will be described in more detail with reference to FIGS. 13 to 15. FIG. 13 is a diagram showing an example of arrangement of a plurality of subjects. As shown in FIG. 13, it is assumed that a subject s1 exists at a distance T1 from an imaging device 2, and a subject s2 exists at a distance T2 from the imaging device 2 (T1>T2). Since T1>T2, the subject s1 is positioned on the back side of the subject s2 when viewed from the imaging device 2.

In the method described above, as shown in FIG. 14, a display device 3b is arranged at a distance P1 from the viewer, and a display device 3f is arranged at a distance P2 (P1>P2) from the viewer. Since P2>P1, the display device 3b is arranged on the back side of the display device 3f when viewed from the viewer. The display device 3b displays the subject s1 positioned on the back side, and the display device 3f displays the subject s2 positioned on the front side. The display device 3f and the display device 3b are arranged side by side in the depth direction when viewed from the viewer. Further, the display device 3f is configured to transmit the display image of the display device 3b so that the viewer visually recognizes the image. Therefore, as shown in FIG. 15, the display image of the display device 3b and the display image of the display device 3f are superimposed and visually recognized by the viewer. Here, by adjusting the distances P1 and P2 to the actual distances T1 and T2, respectively, the distances to the subjects s1 and s2 seen from the viewer match the distances to the actual subjects, so that the viewer can get a more realistic sense of depth.

However, in the above-described method, it was not assumed to display a subject (for example, a ball or a shuttlecock) that moves back and forth between the back side and the front side.

In the following, an example in which a shuttlecock in a badminton game is displayed on the back-side display device 3b will be described. Specifically, a case where the shuttlecock (subject s1) hit by the player on the back side flies toward the front side (towards the imaging device 2) and the player (subject s2) on the front side hits it back with a racket will be considered. In this case, as shown in FIG. 16, the subject s1 on the back side actually moves toward the imaging device 2, the distance T1' from the imaging device 2 to the subject s1 becomes smaller than the distance T1, and the distance between the subject s1 and the subject s2 become smaller.

In the above-described case, as a method for allowing the viewer to visually recognize that the shuttlecock and the racket are in contact with each other, a method of adjusting the position of the display device 3b that displays the shuttlecock so that the shuttlecock and the racket are visually recognized so as to be in contact with each other at a certain viewer position (hereinafter referred to as a "reference viewing position") at the time point at which the shuttlecock and the racket make contact with each other is known. By doing this, at the reference viewing position, as shown in FIG. 17, the subject s1 and the subject s2 are visually recognized so as to be in contact with each other.

However, in this method, it is not possible to present an image to the viewer in an appropriate manner at a position (hereinafter referred to as "non-reference viewing position") deviated from the reference viewing position. FIG. 18 is a diagram showing a state in which an object in a physical space is projected onto the display device 3f and the display device 3b. In FIG. 18, the solid-line circles with numbers indicate the positions of the objects in the physical space projected onto the display device 3b, and the broken-line circles with numbers indicate the positions of the objects in the physical space projected onto the display device 3f. In FIG. 18, black-line circles and broken-line circles with the same numbers respectively indicate the positions of the same object in the physical space projected onto the display device 3b and the display device 3f.

As shown in FIG. 18, when viewed from the reference viewing position, the objects at the same position in the physical space are visually recognized at the same position regardless of the back-side display device 3b or the front-side display device 3f. Therefore, at the reference viewing position, as shown in FIG. 19, the subject s1 displayed on the back-side display device 3b and the subject s2 displayed on the front-side display device 3f are visually recognized so that the objects are in contact with each other at an appropriate position. On the other hand, at the non-reference viewing position, an object at the same position in the physical space is visually recognized at different positions on the back-side display device 3b and the front-side display device 3f. For this reason, as shown in FIG. 20, the subject s1 displayed on the back-side display device 3b and the subject s2 displayed on the front-side display device 3f are visually recognized away from each other or visually recognized so as to be in contact at a position different from an intended position. Thus, it is not possible to present a realistic image.

Therefore, there is a demand for a technology capable of presenting more realistic images.

An object of the present disclosure made in view of the above-mentioned problems is to provide an image display method, an image display device, and a program capable of presenting more realistic images.

Solution to Problem

In order to solve the above problems, an image display method according to the present disclosure is an image display method in an image display device that displays a first display target on a first display device and displays a second display target located on a front side of the first display target on a second display device disposed on a front side of the first display device when viewed from a user so that a display image of the first display device and a display image of the second display device are superimposed and visually recognized by the user, the image display method including: extracting each portion obtained by dividing one display target of the first and second display targets from one display target; determining whether the extracted portion is in contact with the other display target for each portion of one display target based on attribute information indicating presence of contact between each portion and the other display target among the first and second display targets; and displaying the extracted portion on a display device that displays the other display target when it is determined that the extracted portion is in contact with the other display target and displaying the extracted portion on a display device that displays one display target when it is determined that the extracted portion is not in contact with the other display target.

Further, in order to solve the above problem, an image display device according to the present disclosure displays a first display target on a first display device, and displays a second display positioned on the front side of the first display target. An object is displayed on a second display device arranged closer to the user than the first display device, and a display image of the first display device and a display image of the second display device are displayed is superimposed and visually recognized by the user, wherein from one display target of the first display target and the second display target, each portion obtained by dividing the display target is extracted. extracted by the extraction unit based on attribute information indicating presence or absence of contact between the portion and the other display target of the first display target and the second display target for each portion of the one display target a display control unit that determines whether the extracted portion is in contact with the other display target, and the display control unit determines that the extracted portion is in contact with the other display target, The extracted portion is displayed on a display device that displays the other display target, and if it is determined that the extracted portion is not in contact with the other display target, the extracted portion is displayed as the one display target. is displayed on a display device that displays Further, in order to solve the above problems, a program according to the present disclosure causes a computer to function as the image display device described above.

Advantageous Effects of Invention

According to the image display method, image display device, and program according to the present disclosure, it is possible to present more realistic images.

BRIEF DESCRIPTION OF DRAWINGS

FIG. 3 is a diagram showing an example of attribute information stored in an attribute information storage unit shown in FIG. 2.

FIG. 7 is a diagram showing an example of a display image of the image display device shown in FIG. 2 when viewed from a non-reference viewing position.

FIG. 9 is a diagram showing an example of attribute information stored in an attribute information storage unit shown in FIG. 8.

FIG. 12 is a diagram showing an example of a display image of the image display device shown in FIG. 8 when viewed from a non-reference viewing position.

FIG. 20 is a diagram showing an example of a display image viewed from a non-reference viewing position in a conventional method.

DESCRIPTION OF EMBODIMENTS

Hereinafter, an embodiment of the present disclosure will be described with reference to the drawings.

First Embodiment

Figure 1:
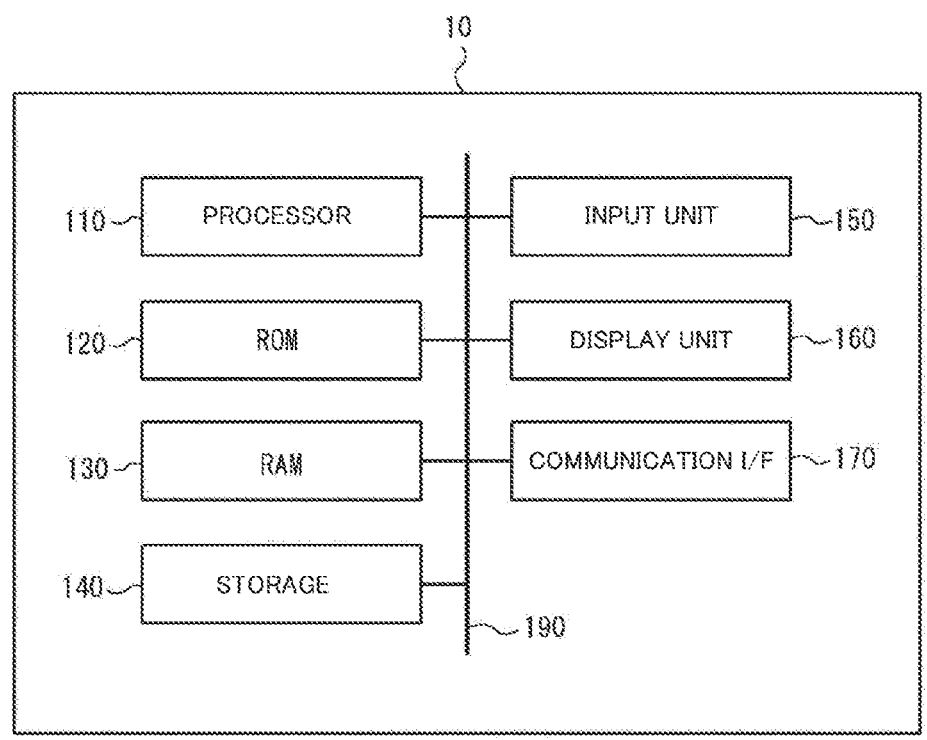
FIG. 1 is a block diagram showing a schematic configuration of a computer functioning as an image display device according to a first embodiment of the present disclosure.

FIG. 1 is a block diagram showing a hardware configuration when an image display device 10 according to a first embodiment of the present disclosure is a computer capable of executing program commands. Here, the computer may be any of a general purpose computer, dedicated computer, work station, PC (Personal Computer), electronic notepad, and so on. The program commands may be program codes, code segments, or the like for executing necessary tasks.

As shown in FIG. 1, the image display device 10 includes a processor 110, a ROM (Read Only Memory) 120, a RAM (Random Access Memory) 130, a storage 140, an input unit 150, a display unit 160 and a communication interface (I/F) 170. The respective components are connected to each other communicably by a bus 190. Specifically, the processor 110 is a CPU (Central Processing Unit), an MPU (Micro Processing Unit), a GPU (Graphics Processing Unit), a DSP (Digital Signal Processor), an SoC (System on a Chip), and the like and may be configured by a plurality of processors of the same type or different types.

The processor 110 controls each component and executes various types of arithmetic processing. That is, the processor 110 reads a program from the ROM 120 or the storage 140 and executes the program using RAM 130 as a work area. The processor 110 performs control of each component and various types of arithmetic processing according to programs stored in the ROM 120 or the storage 140. In the present embodiment, the ROM 120 or the storage 140 stores a program according to the present disclosure.

The program may be provided by being stored on a non-transitory storage medium such as a CD-ROM (Compact Disk Read Only Memory), a DVD-ROM (Digital Versatile Disk Read Only Memory), or a USB (Universal Serial Bus) memory. In addition, the program may be downloaded from an external device over a network.

The ROM 120 stores various programs and various types of data. A program or data is temporarily stored in the RAM 130 that serves as a work area. The storage 140 is constituted by an HDD (Hard Disk Drive) or an SSD (Solid State Drive) and stores various programs, including an operating system, and various data.

The input unit 150 includes a pointing device such as a mouse and a keyboard, and is used for various inputs.

The display unit 160 is a liquid crystal display, for example, and displays various information. By employing a touch panel system, the display unit 160 may also function as the input unit 150.

The communication interface 170 is an interface for communicating with other equipment such as an external device (not shown), and, for example, standards such as Ethernet (registered trademark), FDDI, or Wi-Fi (registered trademark) are used.

Figure 2:
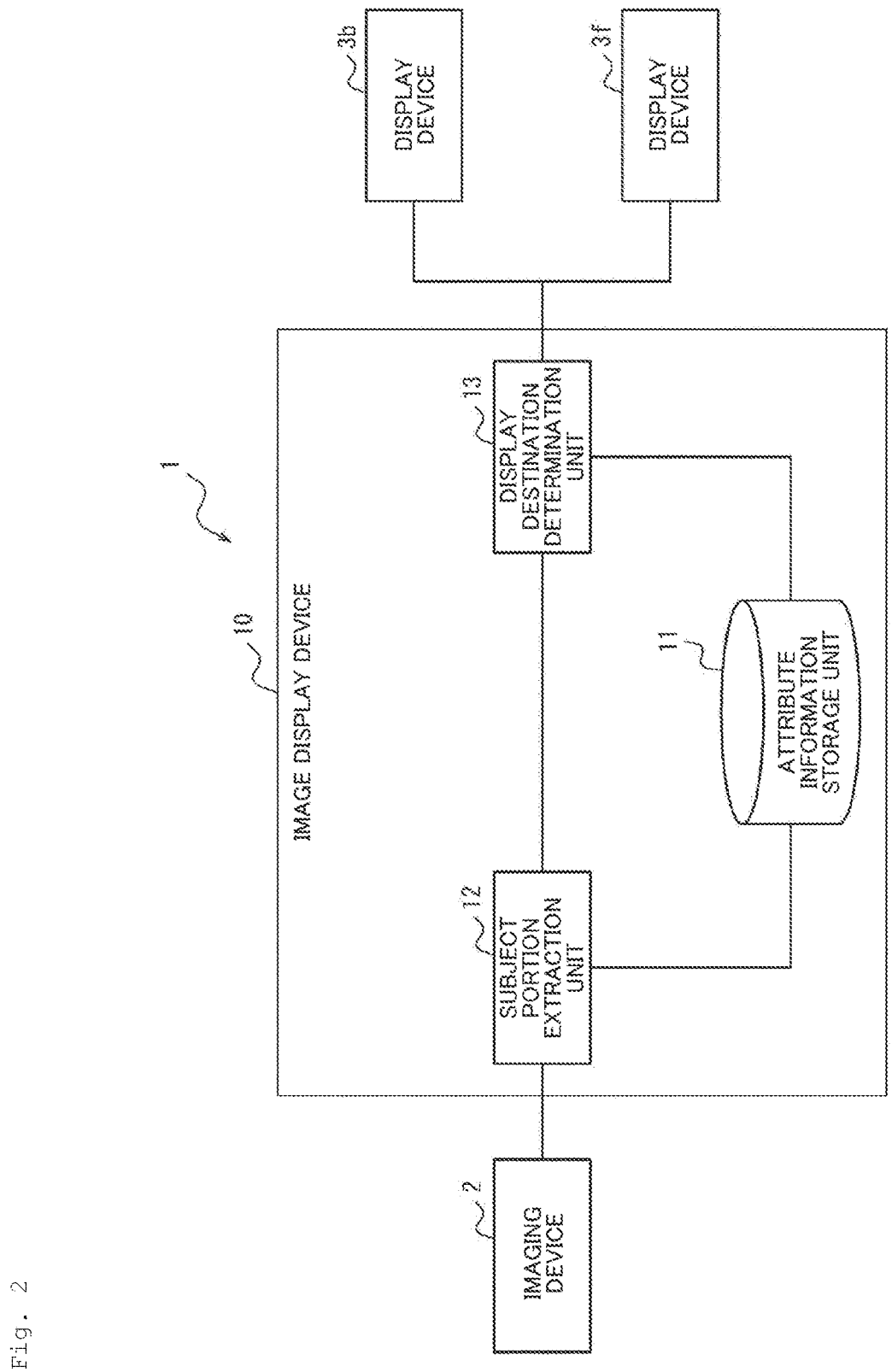
FIG. 2 is a diagram showing an example of a functional configuration of an image display system including the image display device according to the first embodiment of the present disclosure.
Figure 14:
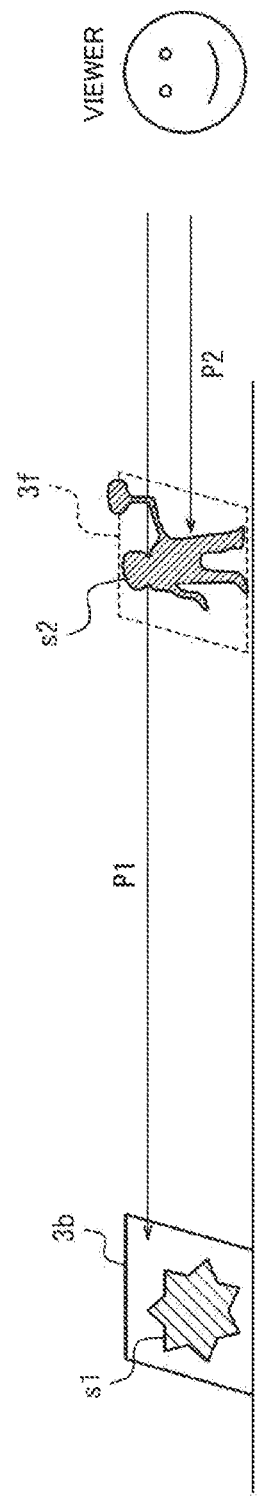
FIG. 14 is a diagram for explaining display of a subject according to a conventional method.
Figure 15:
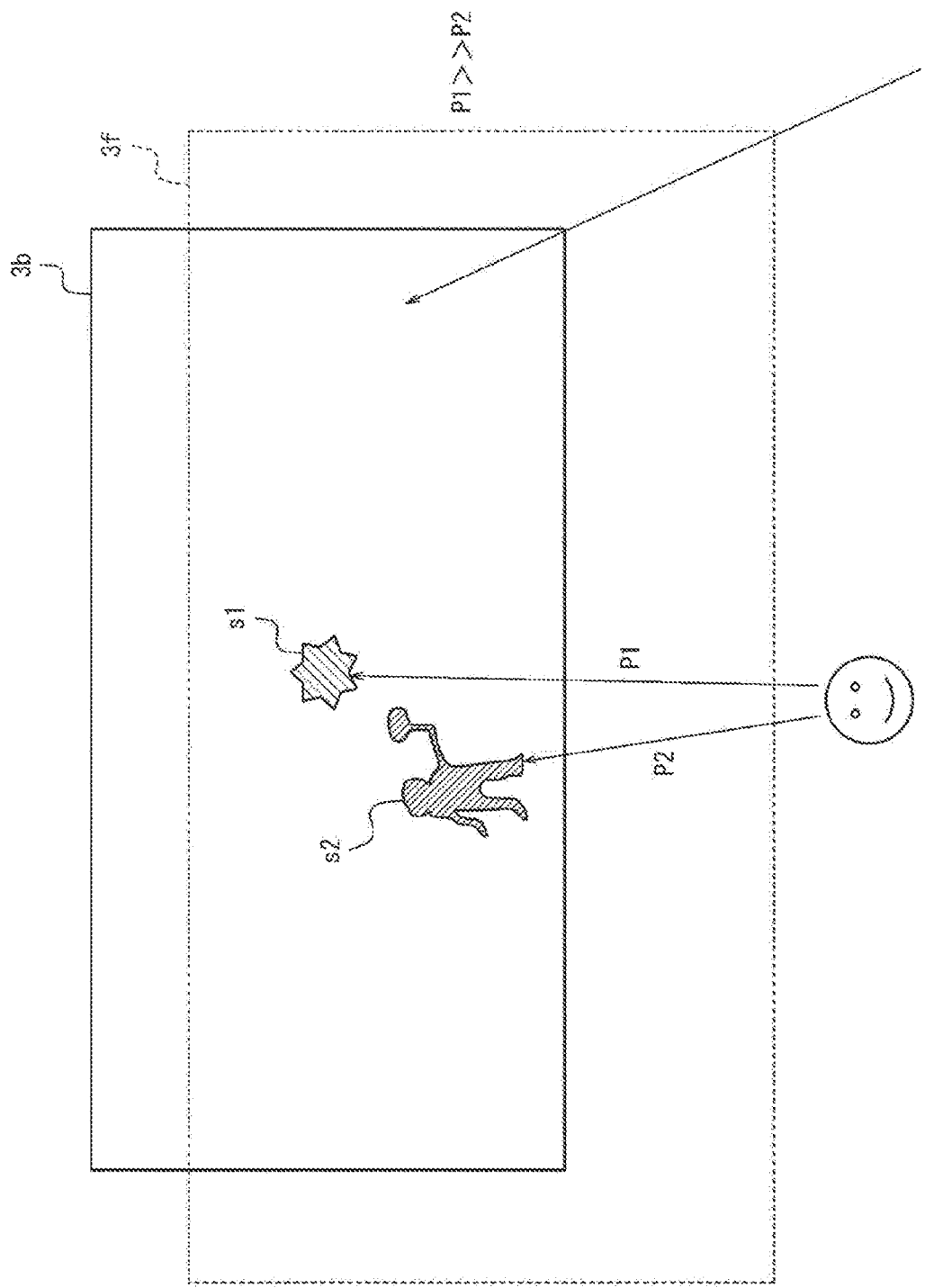
FIG. 15 is a diagram showing an example of a display image by a conventional method.

FIG. 2 is a diagram showing a configuration example of an image display system 1 including the image display device 10 according to the present embodiment. The image display device 10 according to the present embodiment displays a subject in an image photographed by the imaging device 2 on a plurality of display devices 3f and 3b arranged in the depth direction when viewed from the viewer (user) as shown in FIG. 14. In the following description, an example in which a subject s1 (first display target) on the back side when viewed from the imaging device 2 is displayed on the display device 3b as a first display device, and a subject s2 (second display target) on the front side when viewed from the imaging device 2 is displayed on the display device 3f as a second display device will be described.

As shown in FIG. 2, the image display system 1 includes the imaging device 2, the display devices 3b and 3f, and the image display device 10.

The imaging device 2 is a camera that photographs a subject within a predetermined photographing range, and outputs the photographed image to the image display device 10.

The display devices 3b and 3f display images under the control of the image display device 10. As shown in FIG. 14, the display devices 3f and 3b are arranged side by side in the depth direction when viewed from the viewer (user). Specifically, the display device 3b is arranged on the back side when viewed from the viewer, and the display device 3f is arranged on the front side when viewed from the viewer. That is, the display device 3b as the first display device is arranged on the back side of the display device 3f as the second display device when viewed from the viewer. The display devices 3b and 3f display images in such a manner that the display image of the display device 3b and the display image of the display device 3f are superimposed and visually recognized by the viewer. The display devices 3b and 3f display (project) images by, for example, holography. However, the method of displaying images by the display devices 3b and 3f is not limited to this. Any method can be used as long as the display image of the display device 4b and the display image of the display device 4f can be superimposed and visually recognized by the viewer. Hereinafter, the display device 3b and the display device 3f are referred to as the display device 3 when not distinguished from each other.

The image display device 10 according to the present embodiment displays the image photographed by the imaging device 2 on the display devices 3b and 3f. Specifically, as shown in FIG. 14, the image display device 10 displays an image of the subject s1 (first display target) located on the back side when viewed from the imaging device 2 on the display device 3b, and displays an image of the subject s2 (second display target) located on the front side when viewed from the device 2 on the display device 3f. Therefore, the image display device 10 displays the subject s1 (first display target) on the display device 3b (first display device), and displays the subject s2 (second display target) located on the front side of the subject s1 on the display device 3f (second display device) arranged on the front side of the display device 3b when viewed from the viewer (user). Then, the image display device 10 superimposes the display image of the display device 3b and the display image of the display device 3f so that the viewer visually recognizes the images. Note that the image display device 10 may display not only the image photographed by the imaging device 2 but also the subject included in the image reproduced by a reproduction device on the display devices 3b and 3f. Therefore, a source that inputs images including the display target to the image display device 10 is not limited to the imaging device 2.

Next, the functional configuration of the image display device 10 according to the present embodiment will be described with reference to FIG. 2.

As shown in FIG. 2, the image display device 10 according to the present embodiment includes an attribute information storage unit 11, a subject portion extraction unit 12 as an extraction unit, and a display destination determination unit 13 as a display control unit. The subject portion extraction unit 12 and the display destination determination unit 13 may be configured by dedicated hardware such as an ASIC (Application Specific Integrated Circuit) or an FPGA (Field-Programmable Gate Array). Alternatively, as described above, these units may be configured by one or more processors or may be configured to include both. The attribute information storage unit 11 is configured by the ROM 120 or the storage 140, for example.

The attribute information storage unit 11 stores attribute information indicating the presence of contact with the subject s1 (first display target) displayed on the display device 3b for each portion obtained by dividing the subject s2 (second display target) displayed on the display device 3f. FIG. 3 is a diagram showing an example of attribute information stored in the attribute information storage unit 11. The example of FIG. 3 shows an example in which the subject s2 is a player holding a racket in a badminton game.

As shown in FIG. 3, the attribute information storage unit 11 stores, as attribute information, presence of contact between the subject s1 (for example, a shuttlecock) and each portion of the subject s2 (for example, player's body, racket, and the like). The attribute information is input to the image display device 10 via the input unit 150 and stored in the attribute information storage unit 11, for example.

Referring to FIG. 2 again, the subject portion extraction unit 12 extracts the portion of the subject s2 for each portion whose attribute information is stored in the attribute information storage unit 11, from the image photographed by the imaging device 2. Extraction of a predetermined portion from the photographed image by the subject portion extraction unit 12 can be realized using a model learned for extraction of the portion, for example. The subject portion extraction unit 12 outputs the image of the extracted predetermined portion of the subject s2 to the display destination determination unit 13.

The display destination determination unit 13 determines whether the predetermined portion of the subject s2 extracted by the subject portion extraction unit 12 is in contact with the subject s1 based on the attribute information. When the display destination determining unit 13 determines that the extracted portion is in contact with the subject s1, the display destination determination unit 13 displays the image of the portion on the display device 3b instead of the display device 3f on which the subject s2 is displayed. Further, when the display destination determining unit 13 determines that the extracted portion is not in contact with the subject s1, the display destination determination unit 13 displays the image of the portion on the display device 3f. Note that the display destination determination unit 13 displays the subject s1 on the display device 3b.

By doing this, since the portion in contact with the subject s1, of the subject s2 which is the display target of the display device 3f arranged on the front side is displayed on the display device 3b together with the subject s1, the portion which is actually in contact with the subject s1 is prevented from being displayed away from the subject. Therefore, more realistic images can be presented.

In the present embodiment, an example in which the image display device 10 extracts a predetermined portion of the subject s2, displays the portion on the display device 3b when the portion is in contact with the subject s1, and displays the portion on the display device 3f when the portion is not in contact with the subject s1 is described. However, the present disclosure is not limited to this. The image display device 10 may extract a predetermined portion of the subject s1, display the portion on the display device 3f when the portion is in contact with the subject s2, and display the portion on the display device 3b when the portion is not in contact with the subject s2.

That is, the subject portion extraction unit 12 extracts each portion obtained by dividing the display target from one display target among the subject s1 which is the first display target and the subject s2 which is the second display target. The display destination determination unit 13 determines whether the extracted portion is in contact with the other display target for each portion of one display target based on the attribute information indicating the presence of contact with the other display target among the subject s1 which is the first display target and the subject s2 which is the second display target. When the display destination determination unit 13 determines that the extracted portion is in contact with the other display target, the display destination determination unit 13 displays the extracted portion on the display device 3 that displays the other display target. Further, when the display destination determining unit 13 determines that the extracted portion is not in contact with the other display target, the display destination determination unit 13 displays the extracted portion on the display device 3 that displays one display target.

Figure 4:
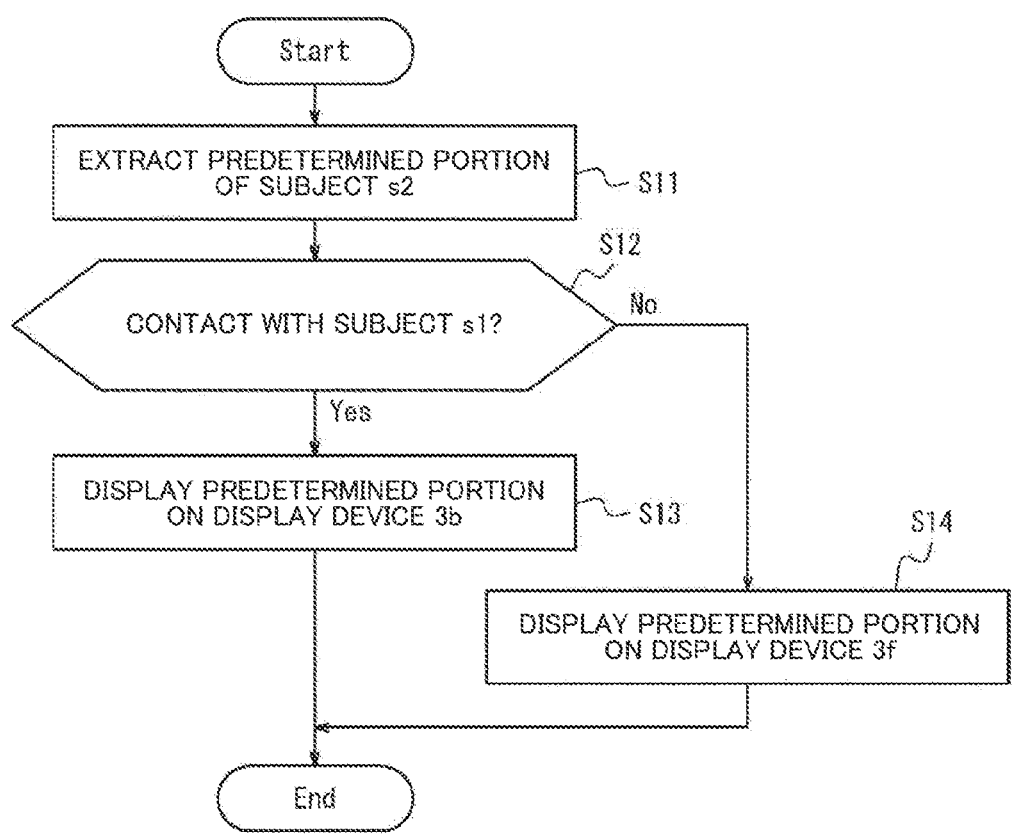
FIG. 4 is a flowchart showing an example of the operation of the image display device shown in FIG. 2.

Next, the operation of the image display device 10 according to the present embodiment will be described. FIG. 4 is a flowchart showing an example of the operation of the image display device 10 according to the present embodiment, and is a diagram for explaining an image display method in the image display device 10.

The subject portion extraction unit 12 extracts a predetermined portion of the subject s2 from the image photographed by the imaging device 2 based on the attribute information (step S11).

The display destination determination unit 13 determines whether the predetermined portion of the subject s2 extracted by the subject portion extraction unit 12 is in contact with the subject s1 based on the attribute information (step S12).

When it is determined that the predetermined portion of the subject s2 is in contact with subject s1 (step S12: Yes), the display destination determination unit 13 displays the portion on the display device 3b (step S13). On the other hand, when it is determined that the predetermined portion of the subject s2 is not in contact with the subject s1 (step S12: No), the display destination determination unit 13 displays the portion on the display device 3f (step S14).

Figure 16:
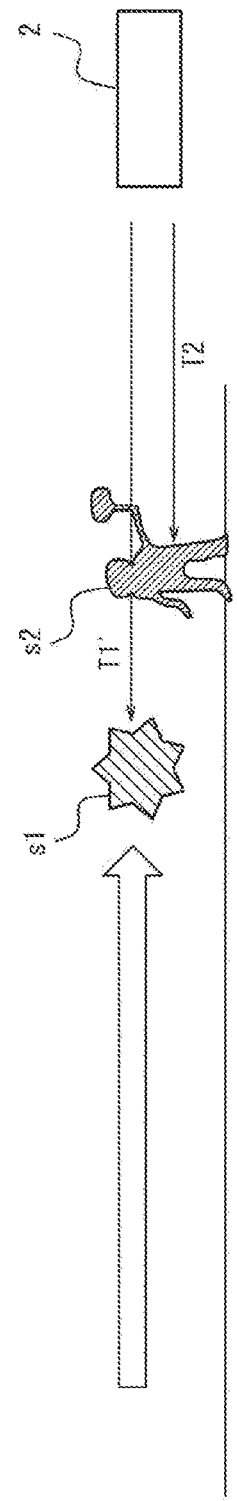
FIG. 16 is a diagram showing another example of the arrangement of the imaging device and the subject.
Figure 17:
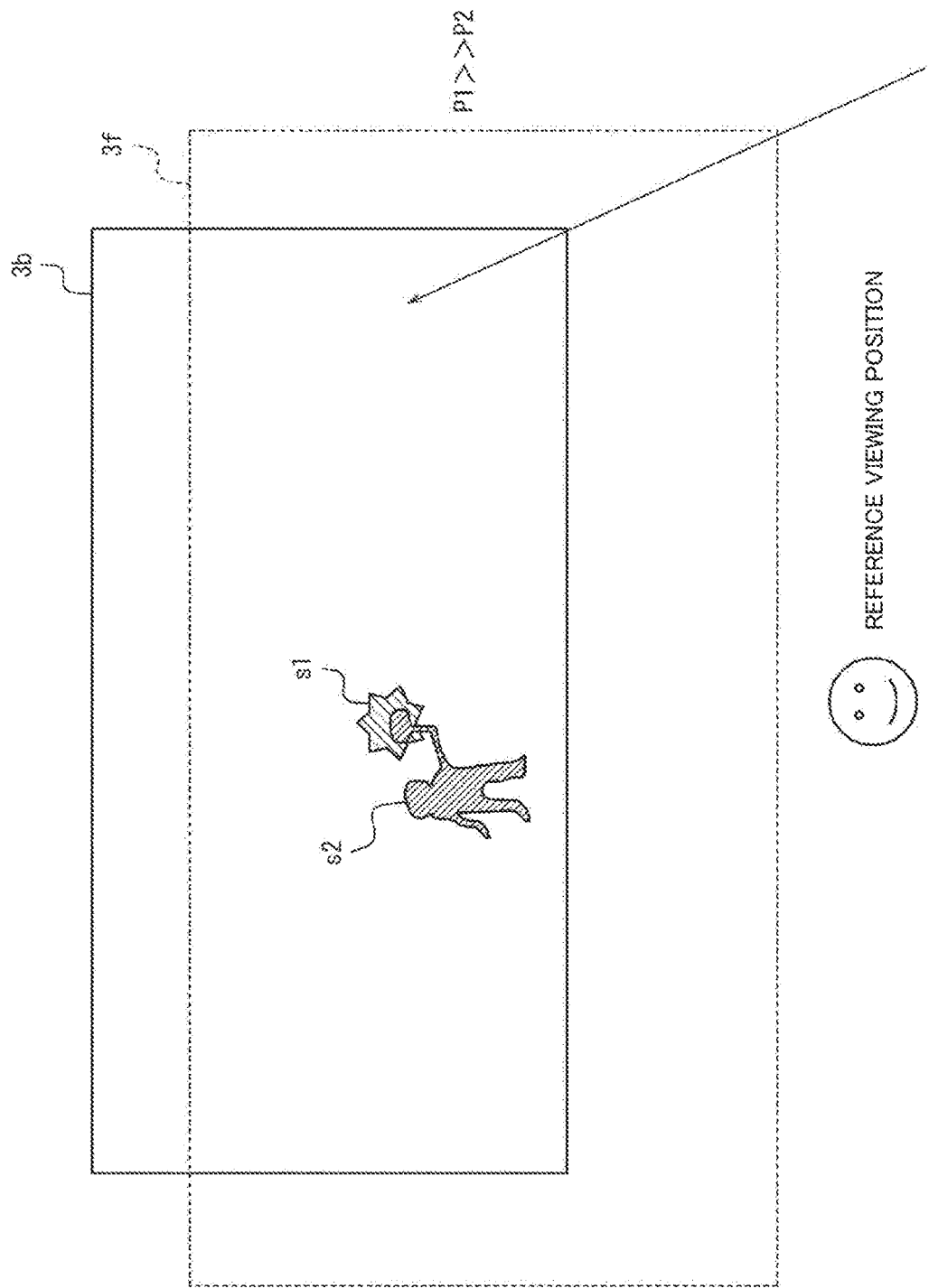
FIG. 17 is a diagram showing an example of adjusting the display position of a subject in a conventional method.
Figure 18:
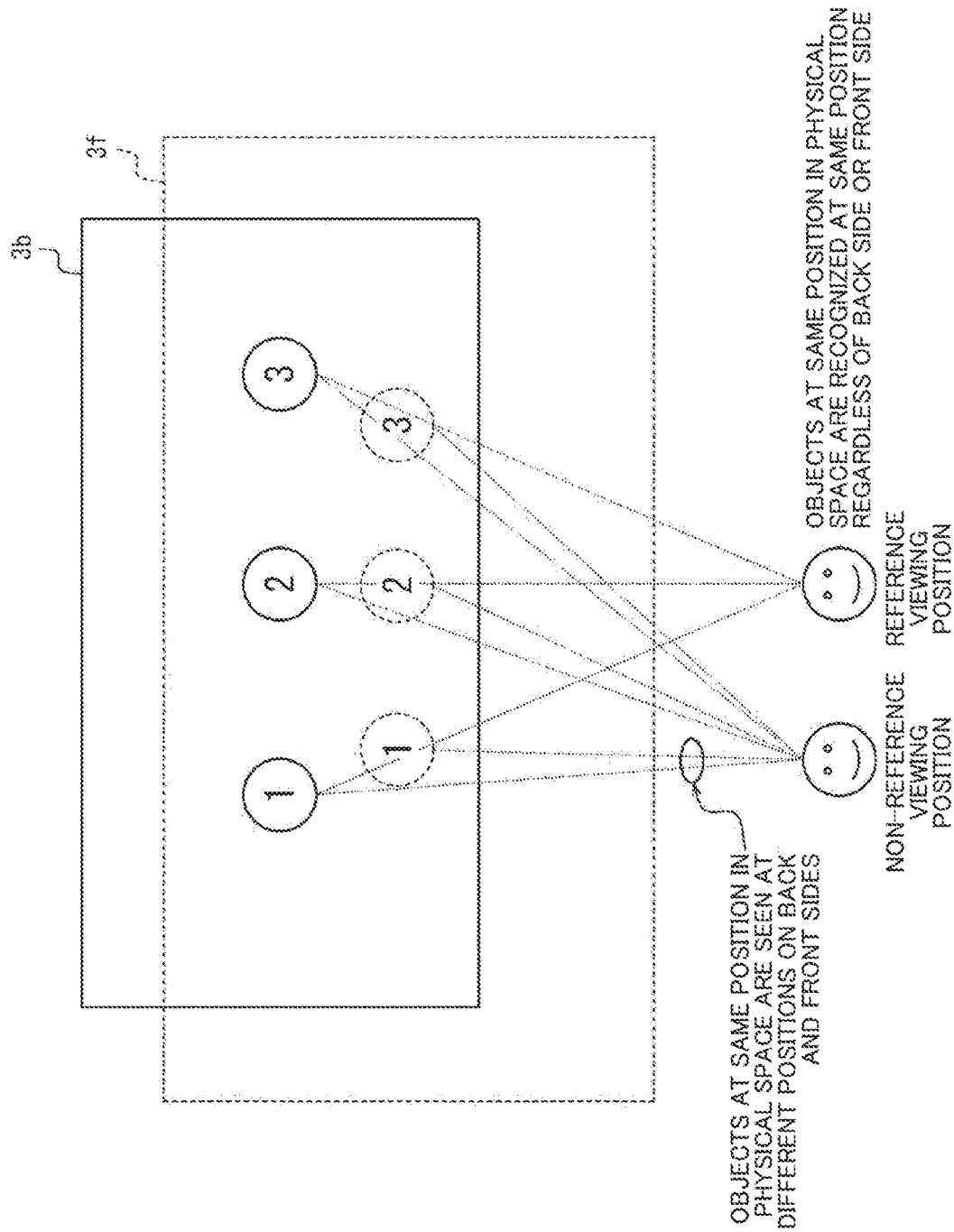
FIG. 18 is a diagram for explaining a difference in appearance of a displayed image at a reference viewing position and a non-reference viewing position.
Figure 19:
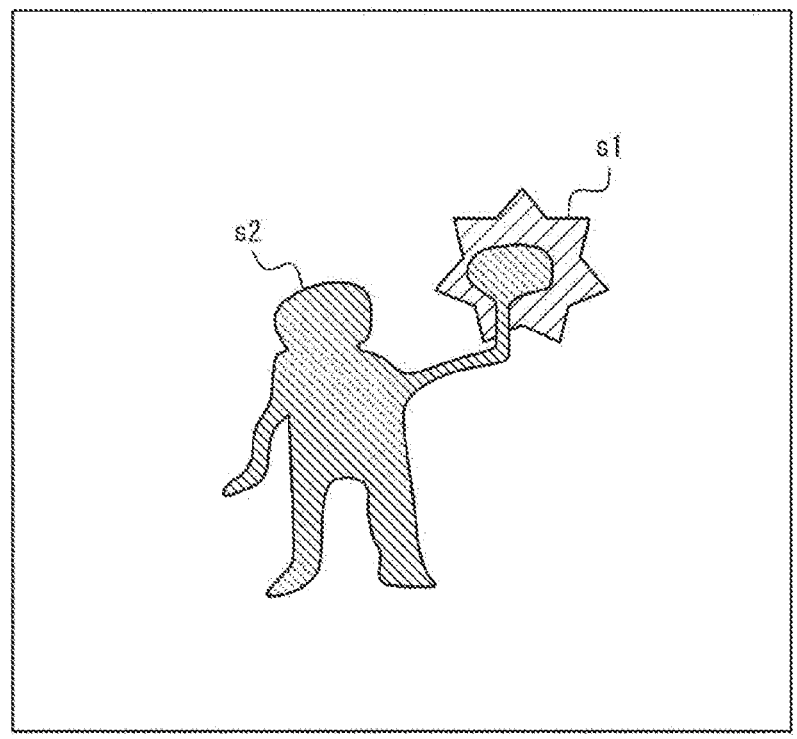
FIG. 19 is a diagram showing an example of a display image viewed from a reference viewing position in a conventional method.

As shown in FIG. 16, when the subject s1 moves to the front side and is in contact with the subject s2, in the present embodiment, attribute information is stored in association with a predetermined portion (for example, a racket) of the subject s2 in contact with the subject s1, indicating that the predetermined portion is in contact with the subject s1.

Figure 5:
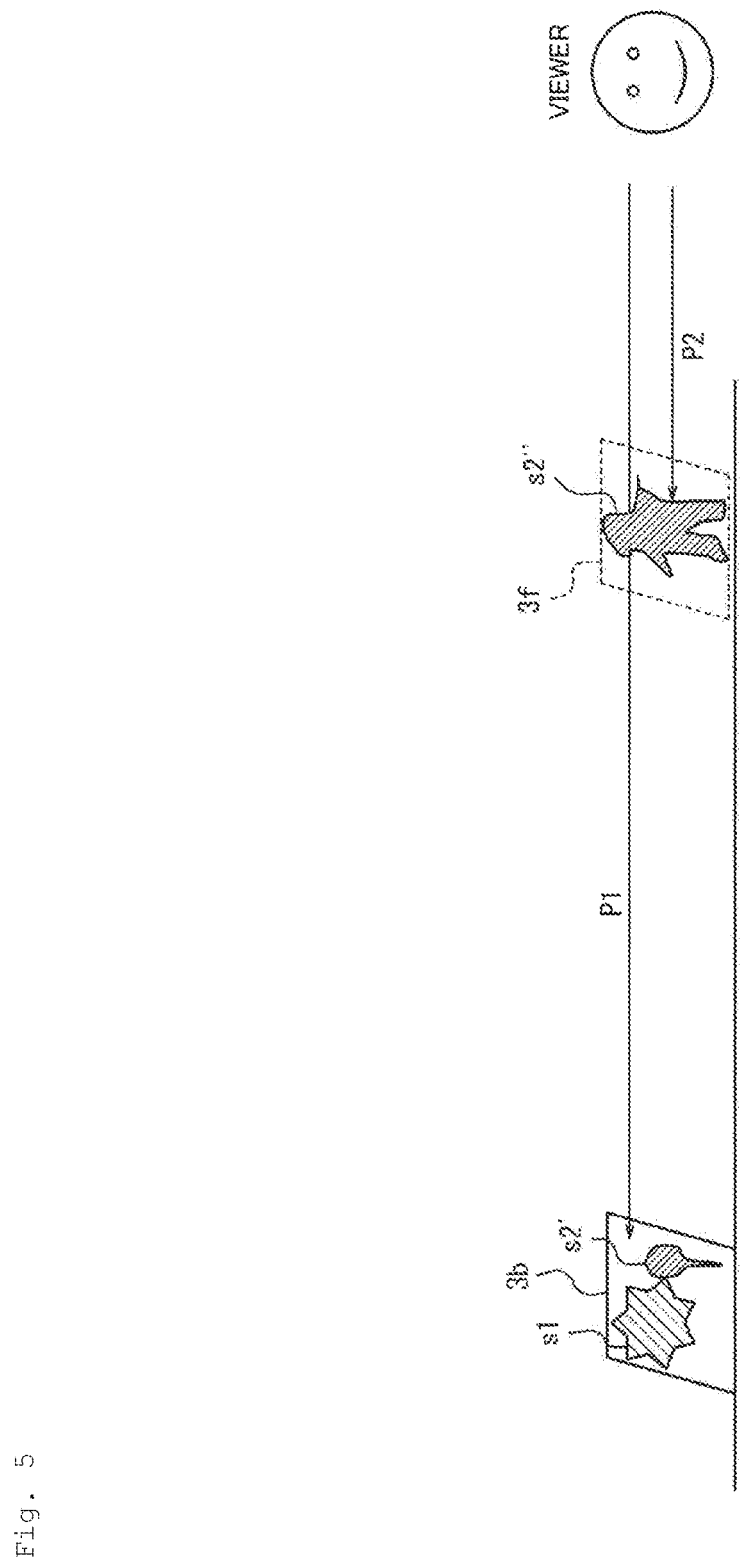
FIG. 5 is a diagram for explaining image display by the image display device shown in FIG. 2.

Based on the attribute information, the display destination determination unit 13 displays a portion s2' of the subject s2 in contact with the subject s1 on the display device 3b, and displays the other portion s2" on the display device 3f, as shown in FIG. 5.

Figure 6:
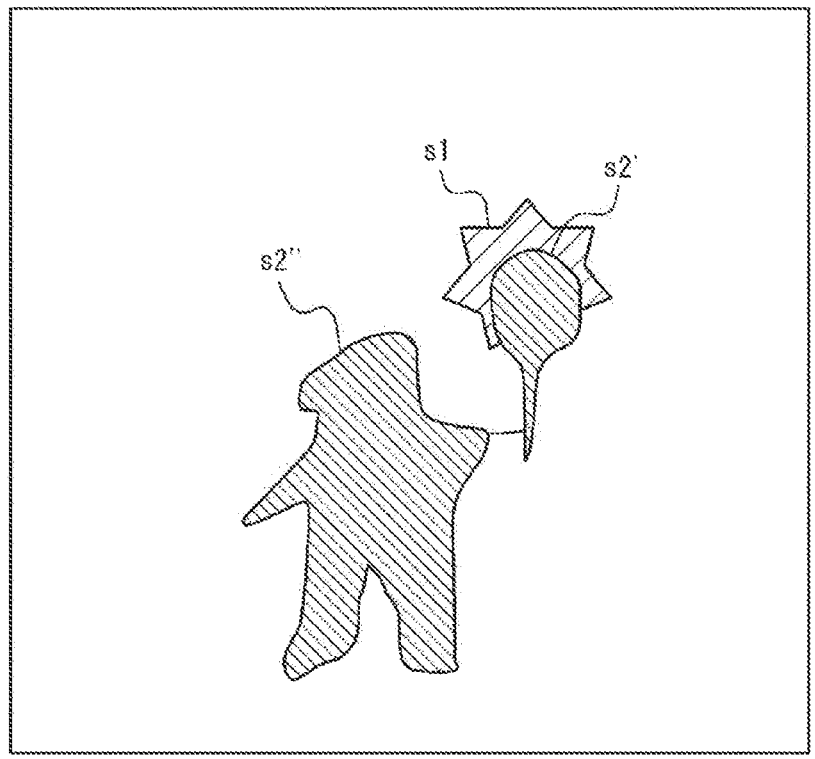
FIG. 6 is a diagram showing an example of a display image of the image display device shown in FIG. 2 when viewed from a reference viewing position.

FIG. 6 is a diagram of the display of the image display device 10 according to the present embodiment when viewed from the reference viewing position. When viewed from the reference viewing position, as shown in FIG. 6, the positional relationship between the display devices 3b and 3f is adjusted in accordance with the actual positional relationship between the subject s1 and the subject s2. The subject s1 (for example, a shuttlecock) and the portion s2' (for example, a racket) of the subject s2 are visually recognized so as to be in contact with each other, and a positional deviation between the portion s2" (for example, a player's body) of the subject s2 and the portion s2' (for example, a racket) will not occur.

FIG. 7 is a diagram of the display of the image display device 10 according to the present embodiment when viewed from the non-reference viewing position. When viewed from a non-reference viewing position, a positional deviation occurs between the portion s2" (for example, a player's body) of the subject s2 and the portion s2' (for example, a racket). However, the subject s1 (for example, a shuttlecock) and the portion s2' (for example, a racket) of the subject s2 are visually recognized so as to be in contact with each other. Therefore, for example, it is possible to present more realistic images without giving the viewer a sense of strangeness that the shuttlecock is hit back while the racket and the shuttlecock are separated from each other.

As described above, the image display device 10 according to the present embodiment includes the subject portion extraction unit 12 as an extraction unit and the display destination determination unit 13 as a display control unit. The subject portion extraction unit 12 extracts each portion obtained by dividing the display target from one of the first and second display targets (the subjects s1 and s2). The display destination determination unit 13 determines whether the extracted portion is in contact with the other display target based on attribute information indicating the presence of contact between each portion of one display target with the other display target among the first and second display targets. The display destination determination unit 13 displays the extracted portion on the display device 3 that displays the other display target when it is determined that the extracted portion is in contact with the other display target and displays the extracted portion on the display device 3 that displays one display target when it is determined that the extracted portion is not in contact with the other display target.

Further, the image display method in the image display device 10 according to the present embodiment includes an extraction step (step S11), a determination step (step S12), and a display step (steps S13 and S14). In the extraction step, each portion obtained by dividing the display target is extracted from one of the first and second display targets (the subjects s1 and s2). In the determination step, whether the extracted portion is in contact with the other display target is determined based on attribute information indicating the presence of contact between each portion of one display target with the other display target among the first and second display targets. In the display step, the extracted portion is displayed on the display device 3 that displays the other display target when it is determined that the extracted portion is in contact with the other display target, and the extracted portion is displayed on the display device 3 that displays one display target when it is determined that the extracted portion is not in contact with the other display target.

The portion of one display target in contact with the other display target is displayed on the display device 3 that displays the other display target together with the other display target, the portion which is actually in contact with the other display target is prevented from being displayed away from the subject. Therefore, more realistic images can be presented.

Second Embodiment

Figure 8:
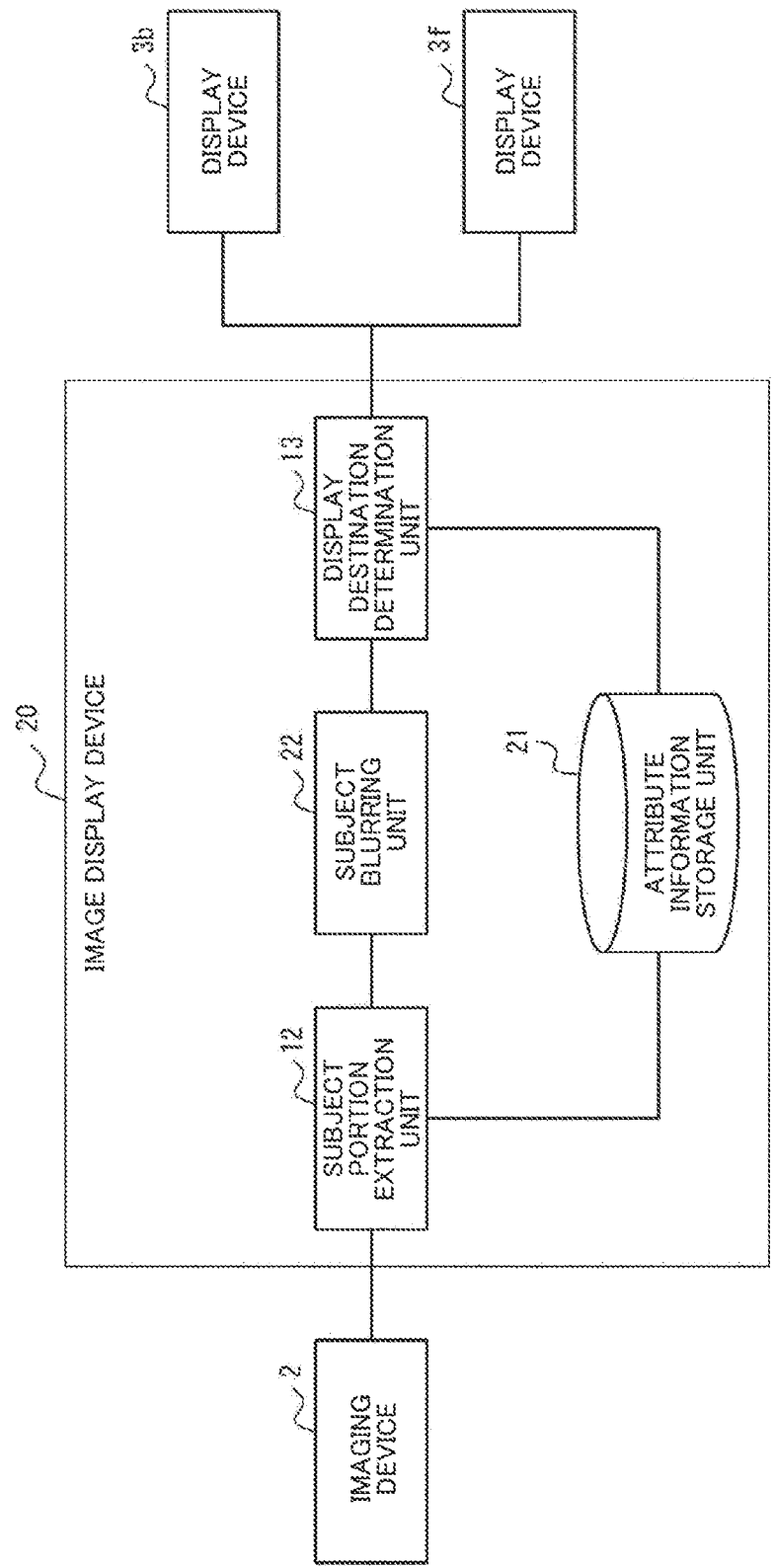
FIG. 8 is a diagram showing an example of a functional configuration of an image display device according to a second embodiment of the present disclosure.

FIG. 8 is a diagram showing the functional configuration of an image display device 20 according to a second embodiment of the present disclosure. In FIG. 8, the same components as in FIG. 2 are denoted by the same reference numerals, and the description thereof is omitted. In the present embodiment, as in the first embodiment, an example in which a predetermined portion of the subject s2 is extracted, the portion is displayed on the display device 3b when the portion is in contact with the subject s1, and the portion is displayed on the display device 3f when the portion is not in contact with the subject s1 will be described.

As shown in FIG. 8, the image display device 20 according to the present embodiment includes an attribute information storage unit 21, a subject portion extraction unit 12, a display destination determination unit 13, and a subject blurring unit 14. That is, the image display device 20 according to the present embodiment differs from the image display device 10 according to the first embodiment in that the attribute information storage unit 11 is changed to the attribute information storage unit 21, and the subject blurring unit 22 is added.

The attribute information storage unit 21 stores, for each portion obtained by dividing one display target (in the present embodiment, the subject s2) among the first and second display targets (the subjects s1 and s2), attribute information indicating the presence of contact between the portion and the subject s1 (first display target) displayed on the display device 3b and the presence of blurring designation that the portion is to be blurred. FIG. 9 is a diagram showing an example of attribute information stored in the attribute information storage unit 21. The example of FIG. 9 shows an example in which the subject s2 is a player holding a racket in a badminton game.

As shown in FIG. 9, the attribute information storage unit 21 stores, as the attribute information, for each portion of the subject s2 (for example, a player's body (arms and portions other than the arms), a racket (a handle or portions other than the handle), and the like), the presence of contact between the portion and the subject s1 (for example, a shuttlecock) and the presence of blurring designation that the portion is to be blurred. The attribute information is input to the image display device 20 via the input unit 150 and stored in the attribute information storage unit 21, for example. The portion designated to be blurred is, for example, a portion in which a positional deviation visually recognized from a viewer due to switching of a display destination of a portion in contact with other display targets among the portions of one display targets is a predetermined amount or more.

The subject blurring unit 22 performs blurring processing for blurring the extracted portion (the extracted portion of one display target) based on the attribute information stored in the attribute information storage unit 21. Specifically, when blurring designation is stored as the attribute information in association with the extracted portion, the subject blurring unit 22 performs blurring processing on the portion. The subject blurring unit 22 performs blurring processing, for example, by setting the color of the pixels forming the image of the portion to an average value of the colors of the surrounding pixels. The subject blurring unit 22 outputs the image of the portion after the blurring processing to the display destination determination unit 13 when the blurring processing is performed and outputs the image of the extracted portion as it is to the display destination determining part 13 when the blurring processing is not performed.

Figure 10:
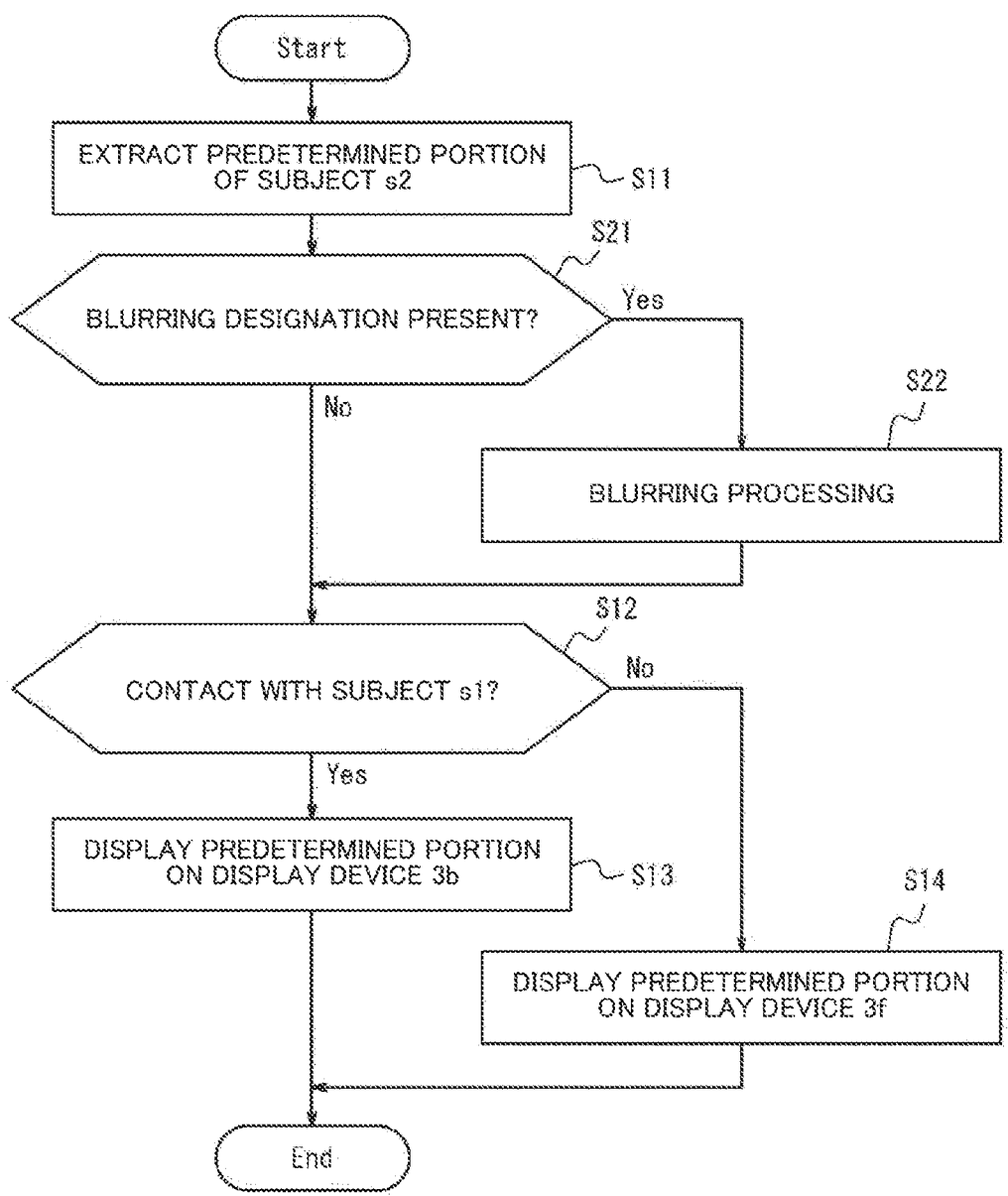
FIG. 10 is a flowchart showing an example of the operation of the image display device shown in FIG. 8.

Next, the operation of the image display device 20 according to the present embodiment will be described. FIG. 10 is a flowchart showing an example of the operation of the image display device 20 according to the present embodiment. In FIG. 10, the same processes as in FIG. 4 are denoted by the same reference numerals, and the description thereof is omitted.

When the subject portion extraction unit 12 extracts a predetermined portion of the subject s2 (step S11), the subject blurring unit 22 determines whether the portion is designated to be blurred based on the attribute information stored in the attribute information storage unit 21 (step S21).

When it is determined that the portion extracted by the subject portion extraction unit 12 is not designated to be blurred (step S21: No), the subject blurring unit 22 outputs the portion to the display destination determination unit 13 without performing blurring processing on the portion.

When it is determined that the portion extracted by the subject portion extraction unit 12 is designated to be blurred (step S21: Yes), the subject blurring unit 22 blurs the portion (step S23) and outputs it to the display destination determination unit 13.

Figure 11:
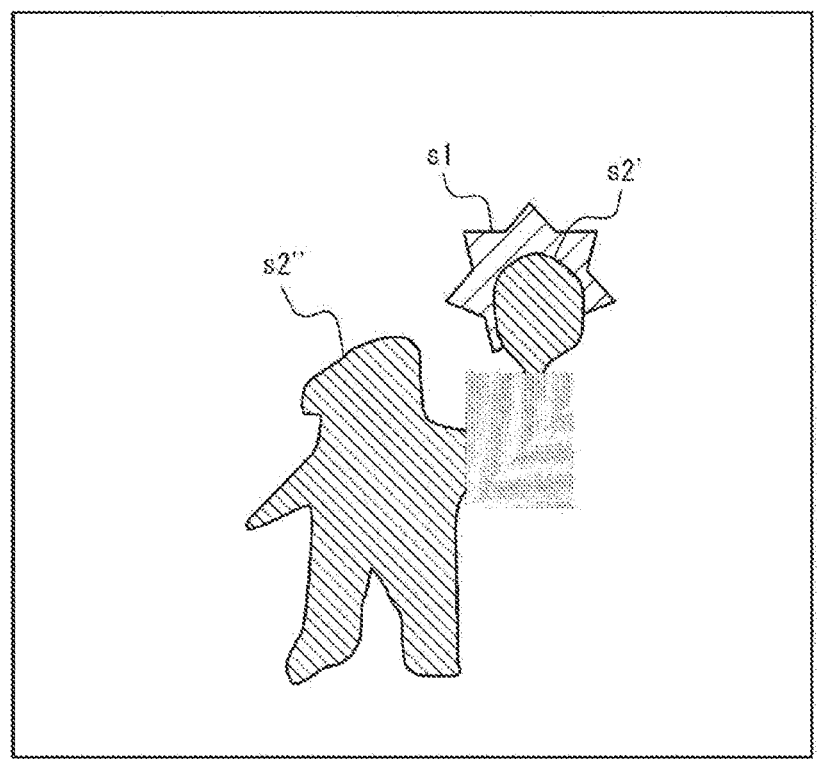
FIG. 11 is a diagram showing an example of a display image of the image display device shown in FIG. 8 when viewed from a reference viewing position.
Figure 13:
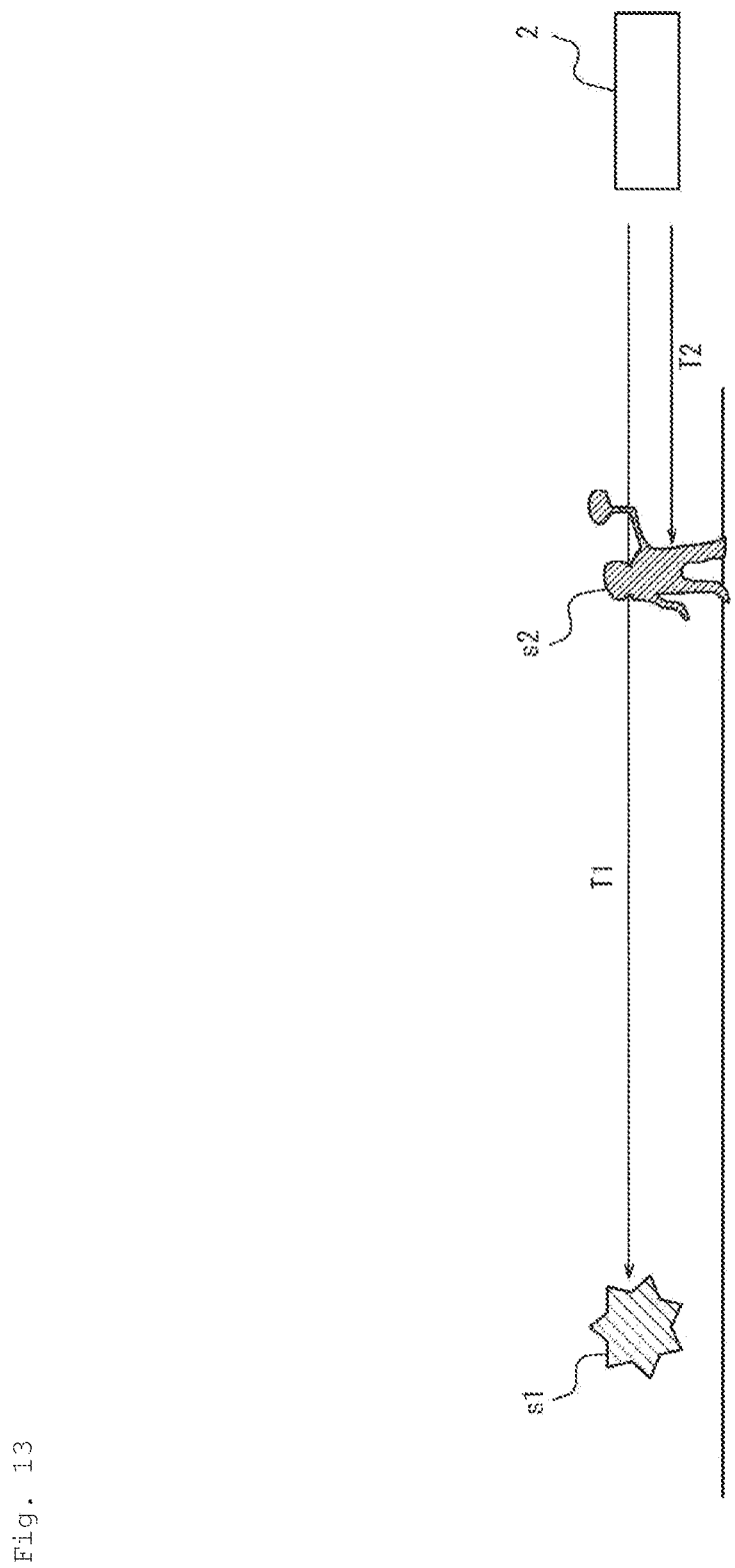
FIG. 13 is a diagram showing an example of arrangement of an imaging device and a subject.

FIG. 11 is a diagram of the display of the image display device 20 according to the present embodiment viewed from the reference viewing position. FIG. 12 is a diagram of the display of the image display device 20 according to the present embodiment viewed from the non-reference viewing position.

As in the image display device 10 according to the first embodiment, in the image display device 20 according to the present embodiment, the subject s1 (for example, a shuttlecock) and the portion s2' (for example, a racket) of the subject s2 are visually recognized so as to be in contact with each other, and a positional deviation between the portion s2" (for example, a player's body) and the portion s2' (for example, a racket) of the subject s2 will not occur. However, the arm portion and the racket handle portion of the subject s2" (player's body) are displayed in a blurred state.

Further, as in the image display device 10 according to the first embodiment, in the image display device 20 according to the present embodiment, a positional deviation occurs between the portion s2" of the subject s2 (for example, the player's body) and the portion s2' (for example, a racket). However, in the present embodiment, blurring processing is performed on a portion whose positional deviation visually recognized by a viewer is large due to switching of a display destination of a portion in contact with another display target among portions of one display target, as shown in FIG. 12, the arms and the handle of the racket of the subject s2" (player's body) are displayed in a blurred state. Therefore, a positional deviation can be made unnoticeable.

All documents, patent applications, and technical standards mentioned in this specification are incorporated herein by reference to the same extent as if each individual document, patent application, or technical standard were specifically and individually indicated to be incorporated by reference.

While one embodiment has been described above as a typical example, it is clear for a person skilled in the art that many alterations and substitutions are possible without departing from the subject matter and scope of the present disclosure.

Therefore the embodiment described above should not be interpreted as limiting and the present invention can be modified and altered in various ways without departing from the scope of the claims.

REFERENCE SIGNS LIST

1 Image display system
2 Imaging device
3b Display device (first display device)
3f Display device (second display device)
10 Image display device
11, 21 Attribute information storage unit
12 Subject portion extraction unit (extraction unit)
13 Display destination determination unit (display control unit)
22 Subject blurring unit
110 Processor
120 ROM
130 RAM
140 Storage
150 Input unit
160 Display unit
170 Communication I/F
190 Bus

The invention claimed is:

1. An image display method, comprising:
    extracting a portion of a first display target from one display target;
    determining whether the extracted portion of the first display target is in contact with a second display target based on attribute information indicating presence of contact between the extracted portion of the first display target and the second display target; and
    displaying, based at least on the determined whether the extracted portion of the first display target is in contact with the second display target:
        at least a part of the first display target on a first display device as first content, wherein the at least a part of the first display target excludes the extracted portion of the first display target, and
        a combination including the extracted portion of the first display target and the second display target on a second display device as second content, wherein the second display device is located in front of the first display device from a viewpoint of a user, thereby the user visually recognizes the first content and the second content as being superimposed.

2. The image display method according to claim 1, wherein
    the attribute information further indicates, for each portion of one display target, whether the portion is to be blurred, the method further comprising:
    performing a blurring process including blurring the extracted portion of the first display target based on the attribute information; and
    displaying the performed blurring portion of the first display target on the second display device.

3. An image display device comprising a processor configured to execute operations comprising:
    extracting a portion of a first display target;
    determining whether the portion extracted of the first display target is in contact with a second display target based on attribute information indicating presence of contact between the extracted portion of the first display target and the second display target; and displaying, based at least on the determined whether the extracted portion of the first display target is in contact with the second display target:
- at least a part of the first display target on a first display device as first content, wherein the at least a part of the first display target excludes the extracted portion of the first display target, and
- a combination including the extracted portion of the first display target and the second display target as second content, wherein the second display device is located in front of the first display device from a viewpoint of a user, thereby the user visually recognizes the first content and the second content as being superimposed.

4. The image display device according to claim 3, wherein the attribute information further indicates, for each portion of one display target, whether the portion is to be blurred, the processor further configured to execute operations comprising:
- performing a blurring process including blurring the extracted portion of the first display target based on the attribute information; and
- displaying the performed blurring portion of the first display target on the second display device.

5. A computer-readable non-transitory recording medium storing computer-executable program instructions that when executed by a processor cause a computer system to execute operations comprising:
- extracting a portion of a first display target;
- determining whether the portion extracted of the first display target is in contact with a second display target based on attribute information indicating presence of contact between the extracted portion of the first display target and the second display target; and
- displaying, based at least on the determined whether the extracted portion of the first display target is in contact with the second display target:
  - at least a part of the first display target on a first display device as first content, wherein the at least a part of the first display target excludes the extracted portion of the first display target, and
  - a combination including the extracted portion of the first display target and the second display target as second content, wherein the second display device is located in front of the first display device from a viewpoint of a user, thereby the user visually recognizes the first content and the second content as being superimposed.

6. The computer-readable non-transitory recording medium according to claim 5, wherein
- the attribute information further indicates, for each portion of one display target, whether the portion is to be blurred, and
- the computer-executable program instructions when executed further causing the computer system to execute operations comprising:
  - performing blurring, based on the attribute information, the extracted portion of the first display target; and
  - displaying the performed blurring portion of the first display target on the second display device.

* * * * *